(12) United States Patent
Lore et al.

(10) Patent No.: US 10,410,633 B2
(45) Date of Patent: *Sep. 10, 2019

(54) SYSTEM AND METHOD FOR CUSTOMER INTERACTION MANAGEMENT

(71) Applicant: JPMorgan Chase Bank, N.A., New York, NY (US)

(72) Inventors: Nicholas M. Lore, Pearl River, NY (US); Alex Lieberman, Marlboro, NJ (US); Prashant Desai, Land O Lakes, FL (US); Parind S. Poi, Lewisville, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,941

(22) Filed: Mar. 1, 2018

(65) Prior Publication Data

US 2018/0190291 A1    Jul. 5, 2018

Related U.S. Application Data

(63) Continuation of application No. 15/245,796, filed on Aug. 24, 2016, now Pat. No. 9,922,649.

(51) Int. Cl.
*G10L 15/22* (2006.01)
*G06Q 30/00* (2012.01)

(52) U.S. Cl.
CPC ............ *G10L 15/22* (2013.01); *G06Q 30/016* (2013.01)

(58) Field of Classification Search
None
See application file for complete search history.

(56) References Cited

U.S. PATENT DOCUMENTS

| 7,224,790 | B1* | 5/2007 | Bushey | H04M 3/5232 |
| | | | | 379/265.13 |
| 9,047,871 | B2 | 6/2015 | Dimitriadis | |
| 9,922,649 | B1* | 3/2018 | Lore | G10L 15/22 |
| 2002/0135618 | A1* | 9/2002 | Maes | G06F 3/0481 |
| | | | | 715/767 |
| 2003/0187660 | A1* | 10/2003 | Gong | G10L 13/027 |
| | | | | 704/277 |

(Continued)

*Primary Examiner* — Douglas Godbold
(74) *Attorney, Agent, or Firm* — Hunton Andrews Kurth LLP (57) ABSTRACT

The invention relates to a customer interaction management system that comprises a memory that stores customer profile data and customer interaction data; a voice response input that receives a voice pattern from a customer; and a computer processor, coupled to the memory and the voice response input, programmed to: retrieve customer voice data from a current customer interaction via a voice channel; retrieve data from one or more other interactions via one or more other channels; compare customer voice data to a customer baseline, where the customer baseline is developed from one or more prior customer interactions; generate, using a speech analytics engine, a customer score that indicates customer sentiment based on the customer voice data and data from one or more other interactions; during the current customer interaction, update the customer score based on customer progress data; and develop one or more actions, in response to the customer score.

20 Claims, 5 Drawing Sheets

(56) References Cited

U.S. PATENT DOCUMENTS

| | | | |
|---|---|---|---|
| 2006/0218032 A1* | 9/2006 | Patrick | G06Q 30/016 |
| | | | 705/1.1 |
| 2010/0158238 A1* | 6/2010 | Saushkin | G06Q 10/06 |
| | | | 379/265.12 |
| 2011/0283190 A1* | 11/2011 | Poltorak | G10L 13/033 |
| | | | 715/716 |
| 2015/0314454 A1* | 11/2015 | Breazeal | B25J 9/0003 |
| | | | 700/259 |
| 2016/0104486 A1* | 4/2016 | Penilla | H04L 67/12 |
| | | | 704/232 |
| 2016/0162807 A1* | 6/2016 | Smailagic | G06N 3/006 |
| | | | 706/12 |
| 2017/0068423 A1* | 3/2017 | Napolitano | G06F 16/90332 |
| 2017/0161016 A1* | 6/2017 | McDunn | G06F 3/167 |

* cited by examiner

SYSTEM AND METHOD FOR CUSTOMER INTERACTION MANAGEMENT

RELATED APPLICATIONS

The subject application is a Continuation Application of U.S. application Ser. No. 15/245,796, filed Aug. 24, 2016, which is hereby incorporated by reference herein in its entirety.

FIELD OF THE INVENTION

The invention relates generally to a system and method for customer interaction management, and more particularly to a system and method that determines customer sentiment during a customer interaction.

BACKGROUND OF THE INVENTION

Current legacy contact centers use data collected in an Interactive Voice Response (IVR) system and general agent availability to route a call. The current routing scheme requires a complex infrastructure to support a single voice channel. Call center agents or specialists often reserve the brunt of the impact when unhappy or angry customers relay complaints or complain about the services they have received. Dealing with multiple volatile customers in the same period of time can cause great amounts of stress for the call center agents.

These and other drawbacks currently exist.

SUMMARY OF THE INVENTION

According to one embodiment, the invention relates to a customer interaction management system that comprises: a memory that stores and manages customer profile data and customer interaction data; a voice response input that receives a voice pattern from a customer; a computer processor, coupled to the memory and the voice response input, programmed to: retrieve customer voice data from a current customer interaction via a voice channel; retrieve data from one or more other interactions via one or more other channels; compare customer voice data to a customer baseline, where the customer baseline is developed from one or more prior customer interactions; generate, using a speech analytics engine, a customer score that indicates customer sentiment based on the customer voice data and data from one or more other interactions; during the current customer interaction, update the customer score based on customer progress data; and develop one or more actions, in response to the customer score.

The method may be conducted on a specially programmed computer system comprising one or more computer processors, mobile devices, electronic storage devices, and networks.

The invention also relates to method for implementing a customer interaction management method, the method comprising the steps of: retrieving, using a voice response input, customer voice data from a current customer interaction via a voice channel; retrieving data from one or more other interactions via one or more other channels; comparing, using a computer processor, customer voice data to a customer baseline, where the customer baseline is developed from one or more prior customer interactions; generating, using a speech analytics engine, a customer score that indicates customer sentiment based on the customer voice data and data from one or more other interactions; during the current customer interaction, updating the customer score based on customer progress data; and providing one or more actions, in response to the customer score.

The computer implemented system, method and medium described herein provide the advantages of an improved customer experience. The innovative system and method intelligently routes customer interactions to agents/specialists equipped to handle customers based on attributes captured during interaction with assisted and unassisted channels. Automatic escalation to a supervisor helps reduce churn. Also, data collected may be used for predictive analytics on customer interaction patterns. Customer interaction patterns in addition to call volume may drive workforce management forecasting and scheduling resulting in cost savings and improved Agent/Specialist availability. Customer interaction context may be shared across multiple customer touch points allowing for an improved customer engagement and experience. Other advantages that can be provided are customer loyalty and retention due to the increased customer satisfaction. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to simplifying a customer interaction assisted or unassisted across one or more channels and utilizing analytics from a current interaction and previous interactions to match an appropriate agent or specialist. For example, an embodiment of the present invention abstracts an interaction channel the customer uses to contact an entity, e.g., financial institution, merchant, service provider, etc. The system of an embodiment of the present invention optimizes routing based on internal events as well as customer interaction and/or behavior. The system of an embodiment of the present invention may use emotion, sentiment and behavior in addition to internal system events generated across multiple touch points.

An embodiment of the present invention is directed to detecting customer mood based on customer interaction and/or behavior. For example, an embodiment of the present invention may use voice detection to determine customer tones as a customer interacts an Intelligent Voice Response system (IVR) or other automated assistant. The system may compare the current tone of the customer to a baseline tone that has been developed using prior in-person, offline and/or other interactions. If prior interaction data is not available, the system may apply a generic baseline that is appropriate based on available information (e.g., gender, age, demographic data etc.). In this example, if the tone is a threshold percentage higher (or lower) than the baseline, the system may prompt an agent that the customer may be in a volatile state. A range may be applied where varying percentages represent different customer states. The system may also learn from the customer's behavior. For example, a customer may have a tendency to talk loud, without being angry. Accordingly, the threshold percentage may be adjusted for this particular customer.

The system may also identify other signs of frustration, such as heavy breathing, grunts, long sighs, mobile device movement, etc. The system may also detect if the customer is yelling at someone in the room. For example, if the customer is calling from a cell phone (e.g., a cell phone with an app associated an entity or service provider), the system may detect if the customer is pacing. The system may also consider whether a keypad, touchpad or other input is violently pressed, held down for a long time and/or multiple buttons are being pressed. For example, some customers may immediately press a key (e.g., "0") at the start of an IVR process. This may indicate frustration and urgency. Other actions that may be detected include a phone tossed, quick movements, etc. The system may also identify certain actions specific to a particular customer that indicate that this customer is upset or agitated.

According to another example, the system may use cookies installed on a customer's phone, computer and/or other device, to identify relevant customer activity, such as website visits, search terms, research topics, etc. For example, the customer may have searched for fraud or identify theft websites. The customer's online activity may provide context into what the problem may be.

The system may identify recent customer related events (e.g., over draft fees, loss of capital gains, potential fraud, etc.) which may prompt the customer to be in a volatile state. The agent may be informed of the potential reason via an agent interface on a device. The system may route certain calls to a manager or supervisor proactively if there is a high degree of confidence that the customer will request the manager's presence on the call. Similarly, the call may be intelligently routed to a more capable agent (e.g., an agent who specializes in credit card fraud). For example, if a prior agent successfully addressed an earlier issue or had a positive interaction with this customer, the system may route the customer accordingly.

The system, after identifying an angry or upset customer, may ensure the IVR process is significantly shortened and then promptly pass the caller to a knowledgeable and/or experienced agent. Also, the agent handling the call may receive a progress report as the call is improving or declining. If the tone of the customer is dropping back to the baseline tone, the agent may be notified that the customer is calming down and progress is being made. Otherwise, the agent may be given prompts for other actions to address customer.

If an agent has been identified as having been on a long call with a volatile customer, the system can ensure this agent is not on another difficult call for a period of time. An embodiment of the present invention may apply machine learning for predictive analytics with respect to routing decisions, matching agents to customers, prioritization, performance insights across channels, etc.

While the exemplary illustrations are directed to a customer interactions with a financial institution, the various embodiments of the present invention may be applied to various service-based industries.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 1:
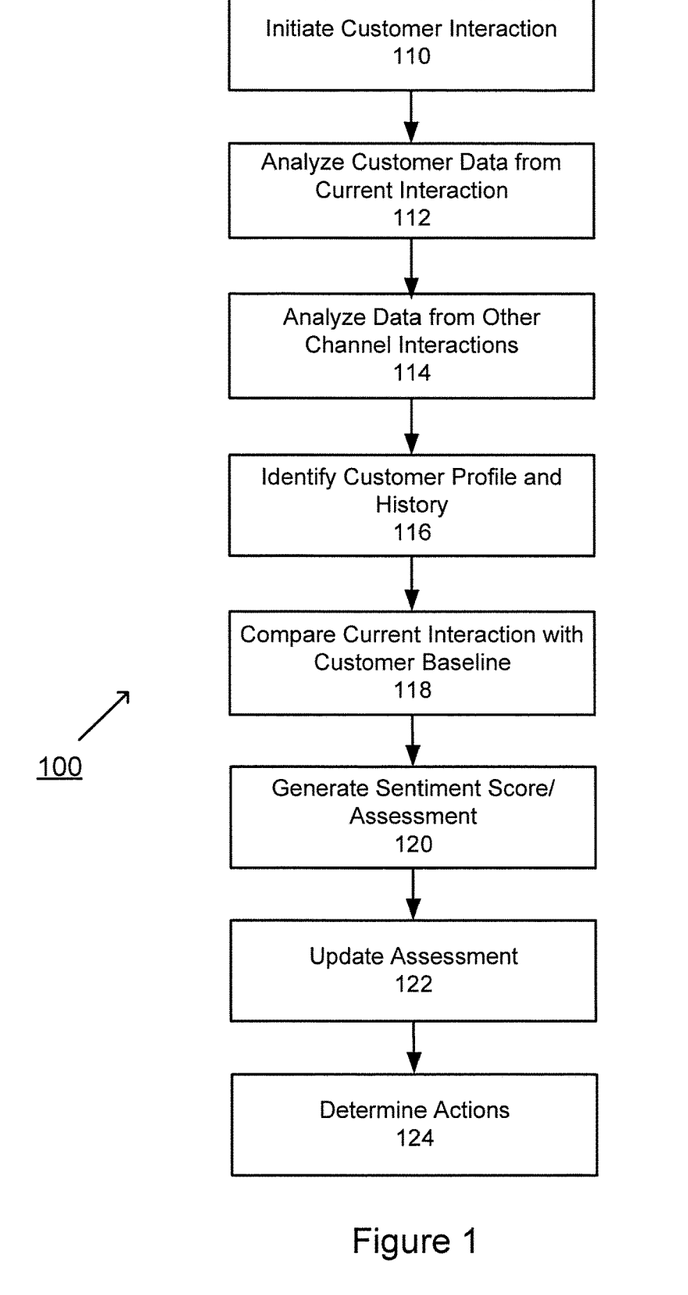
FIG. 1 is an exemplary flowchart of a method for customer interaction management, according to an embodiment of the present invention.

FIG. 1 is an exemplary flowchart of a method for customer interaction management, according to an embodiment of the present invention. At step 110, a customer may interact with an entity. At step 112, the system may identify customer interaction tone data from a current interaction. At step 114, the system may analyze other channel interactions. At step 116, the system may identify customer profile and prior interaction data. At step 118, the system may compare the current interaction tone data with a customer baseline based on the prior interaction data. At step 120, the system may generate a sentiment score and assessment. At step 122, as the interaction continues, the system may revise or update the sentiment assessment. At step 124 the system may identify one or more actions. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 110, a customer may interact with an entity, such as a financial institution, merchant representative, service provider, as well as other agent or representative. The customer may interact with an agent, IVR, and/or other interactive mechanism.

At step 112, the system may identify customer interaction tone data from a current interaction. The tone data may be extracted by the customer's speech sample. The tone data may represent the entirety of the customer's speech or a select portion. The system may identify speech patterns including speed, volume, language, etc. For example, the customer may interact with an IVR by providing response terms (e.g., "billing," "account," etc.) as well as free speech (e.g., "I have a question about my debit card," etc.). The system may also identify terms and/or phrases that indicate frustration, angry and/or other sentiment (e.g., "I need help with . . . ," "I'm frustrated because . . . ," "It's very important that . . . ," etc.).

At step 114, the system may analyze other channel interactions. Other channel interactions may include recent activity concerning an account, e.g., withdrawal, ATM interaction, etc. Other activity may include recent transactions, interactions with a merchant or service provider. The system may also capture search terms, online activity, etc. Oftentimes, customers may search online for answers using a search engine or by visiting an entity's website before contacting the entity. The system may use the search terms, articles accessed, websites visited as well as other online behavior to determine additional insight as to the customer's concern.

At step 116, the system may identify customer profile and prior interaction data. Using identification information (e.g., customer identifier, card number, etc.), the system may identify a customer profile. The customer profile may include customer identification data, demographic data, prior interaction data, prior transaction data, customer preferences, etc. Customer profile data may also include a customer tone baseline that may be generated from prior customer interactions. If prior interaction data is not available, the system may apply a generic baseline that is appropriate based on the available information including gender, age, demographic data and/or other information.

At step 118, the system may compare the current interaction tone data with a customer baseline based on the prior interaction data. The system may recognize that when there is a differential of over or under a threshold, a customer is considered to be angry, upset or headed in that direction. Other metrics, indications or measurements may be implemented.

At step 120, the system may generate a sentiment score and assessment. For example, a customer may download an application, such as a mobile application, and provide voice samplings. An internal app system, such as an Artificial Intelligent (AI) assisted may receive the voice samplings. Also, the system may collect and establish tone of voice from previously recorded calls and other calls or interactions. The system may determine a broad baseline, which may develop a baseline pitch and variance for standard individuals from call samples among users and agents.

An embodiment of the present invention may interact with a first time caller. In this scenario, the first time caller may be prompted to explain to the system (e.g., IVR, AI app, etc.) why they are calling via voice. The system may interact with the first time caller in various ways. For example, the first time caller may be asked to rank 1-5 through a keypad a variety of questions. In response, the first time caller may be automatically directed straight to an agent and prioritized by the agent. In this example, the system may remove background noise from call and identify the voice of caller from that of the agent (who is already registered in system as a unique voice). The system may then adjust from the initial call a baseline of the first time caller against a broad baseline if independent customer data does not exist or previous steps mandate it. The system may then determine, using agent input if necessary, if the baseline is appropriate for the customer. The system may update the baseline during the call and in subsequent calls with agent assistance.

For a repeat caller, the system may identify an initial baseline of customer and their ranking of anger for that baseline. In this case, the system may remove background noise from call and identify the voice of caller from that of the agent (who is already registered in system as a unique voice). The system may then adjust from the initial call a baseline of the customer against their initial baseline to determine if their anger is higher or lower ranked. If the customer sentiment is lower, the system may record this as a potentially new lower baseline, but preserve the old data of recognizing the previous anger rank and baseline as well. This data may be used to identify that level of anger during a subsequent interaction as well as for comparison. The system may then determine, using agent input if necessary, if the baseline is appropriate for the customer. The system may update the baseline during the call and subsequent calls and interactions with agent assistance.

At step 122, as the interaction continues, the system may update the sentiment assessment. For example, as the customer's needs are addressed, the system may recognize that the customer's tone is reaching a normal state. The system may inform the agent that the customer is responding well. In another situation where the customer is becoming increasingly upset, the system may alert the agent and provide feedback (e.g., provide empathy statements, etc.).

At step 124 the system may identify one or more actions. For example, if the customer is not responding well, the system may alert the agent and provide action items or other suggestions. Also, the system may route the customer to a supervisor who may be fully briefed on the situation and provide an incentive or other response to address the customer's concerns. If the customer is responding well, the agent may proceed with the call. Data generated and collected may be used for analysis, such as predictive analytics on customer interaction patterns. Also, customer interaction patterns may drive workforce management forecasting and scheduling. Moreover, customer interaction data may be shared across multiple customer touch points allowing for improved customer engagement and experience.

The system may also perform post assessment actions. For example, post assessment may allow customers to provide a resolution feedback of the call, e.g., ranking a resolution level with a 1 to 5 satisfaction range. Other indicators, factors, ranges, scores and/or rankings may be applied as well. The post assessment may be completed in the same call to avoid additional contacts. Also, the post assessment may include a follow-up communication via a phone call or a different mode of communication (e.g., text, in-app interaction, etc.) and/or other contact. According to an exemplary scenario, the agent may disconnect from the call and the customer may press a keypad and/or voice a rank of 1 to 5, for example. This score may be part of an agent's statistics. Also, the score may be used to potentially provide curving of anger (or sentiment) ranks during the call.

An example of curving may include ranking anger (or sentiment) from 1 to 5 (5 being the highest) and ranking resolution from 1 being not resolved to 5 being resolved. If the customer was baselined at a "3" for anger and scored a "1" on resolution (meaning they were medium angry and the issue was not resolved), then the curving may adjust the anger ranking higher to a 4 or 5, because perhaps they do not voice their anger as much as others. The customer's other interactions and scores may also be analyzed for reference.

According to an exemplary embodiment, the system may analyze customer interactions and sentiment assessment and if their anger escalated during the call and was not resolved, this may inform the agent to potentially provide a follow up call or contact. Other exemplary post assessment questions may include but are not limited to: How did you feel about the call?; How did you feel about your agent assisting you?; How do you feel about the resolution you received?; Do you feel we handled the call in an appropriate time? Other forms of communication may also include voice response, text response, responding with emoticons, graphics, animations, etc.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Figure 2:
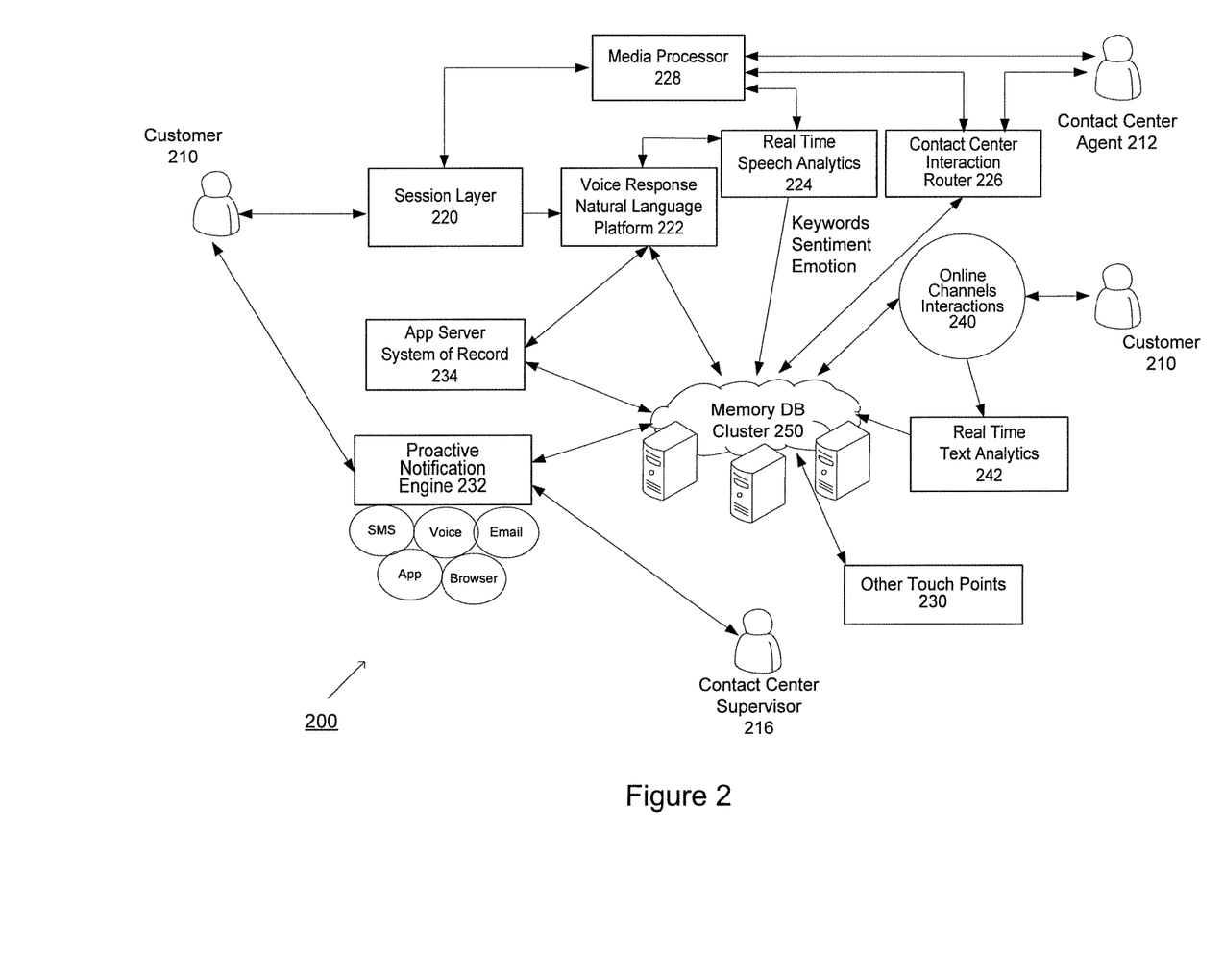
FIG. 2 illustrates a schematic diagram of a customer interaction management system, according to an exemplary embodiment.

FIG. 2 illustrates a schematic diagram of a customer interaction management system 100, according to an exemplary embodiment. As shown in FIG. 2, Customer 210 may have a voice interaction with an entity. This may occur via a communication connection, such as phone TDM, phone VoIP, Internet voice, etc. Session Layer 220 may route a voice call to a Voice Response Natural Language Platform 222. Real Time Speech Analytics Engine 224 may detect customer emotion and sentiment by analyzing the customer's speech. Engine 224 may generate a score or other indicia which may be sent to Memory 250. Platform 222 may also communicate with App Server System 234 which may store and retrieve data from Memory 250.

During an IVR or other self-service session, the customer may request to speak with an agent or specialist. The request may be sent to Media Processor 228 and then routed to an Agent 212. Speech data may be sent to Real Time Speech Analytics 224 for processing and analytics. Contact Center Interaction Router 226 may store speech and other analytics, which may then be used to route the customer to an appropriate agent, as represented by 212.

Touch Points interface 230 may generate events from various forms of customer interactions, such as ATM transactions, credit card interactions, social media, etc. Other examples may include customer events, such as credit card declines, web access failure, mobile access failure, other backend failures, other offline approvals, social media activity, and customer payments. Touch Points interface 230 may store filtered, selected and/or concise customer interactions in Memory 250. Proactive Notification Engine 232 may monitor a data store of events and determine if a notification needs to be sent to a customer, supervisor, agent and/or other participant to improve customer experience. For example, a notification may be sent to Customer 210 via voice channel. In addition, a notification may be sent to a Supervisor 216 via an application or SMS.

Customer interactions may also include alternate channels, such as websites, chat, email, SMS, etc. Other channels may include systems that provide automated responses or self-service ability. Such interactions may be captured at Interface 240. The interactions may be received by Real Time Text Analytics Engine 242 that processes keywords and detects customer sentiment. Real Time Text Analytics Engine 242 may store keywords and sentiment in Memory 250 for consumption and analytics by other components of the system. Customer interactions may trigger a need for a supervisor to listen in to help the agent or intervene to take over the interaction, by Proactive Notification Engine 232.

As illustrated, each component and device may be communicatively coupled with one or more other devices via a communication link or network. System 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. System 200 described below may be used to implement the various methods herein, by way of example. Various elements of the system 200 may be referenced in explaining the exemplary methods described herein.

The network implemented in System 200 may be a wireless network, a wired network or any combination of wireless network and wired network. For example, the network may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network may support an Internet network, a wireless communication network, a cellular network, Bluetooth, or the like, or any combination thereof. The network may further include one, or any number of the exemplary types of networks mentioned above operating as a stand-alone network or in cooperation with each other. The network may utilize one or more protocols of one or more network elements to which it is communicatively coupled. The network may translate to or from other protocols to one or more protocols of network devices. Although the network is depicted as one network for simplicity, it should be appreciated that according to one or more embodiments, the network may comprise a plurality of interconnected networks, such as, for example, a service provider network, the Internet, a cellular network, corporate networks, or even home networks, or any of the types of networks mentioned above.

Data may be transmitted and received via network utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 2 illustrates individual devices or components, it should be appreciated that there may be several of such devices to carry out the various exemplary embodiments.

For example, Touch Points 230 may receive inputs from various devices, including a financial transaction device which may represent EBKs, automated teller machines ("ATMs"), personal teller machines ("PTMs"), financial self-service devices, financial services kiosks, financial transaction devices, portable electronic devices, money machines, cash machines, bank machines, and bancomats, for example. The financial transaction device may be associated with and/or operated by a financial institution. The financial transaction machine may be connected directly with the financial institution, or indirectly using a payment network, processor, or gateway.

Customer 210 may communicate with the system using various devices, including any mobile or computing device, such as a laptop computer, a personal digital assistant, a smartphone, a smartwatch, smart glasses, other wearables or other computing devices capable of sending or receiving network signals. The devices may have an application installed that is associated with the financial institution, for example.

Memory 250 may contain and manage data and information used by the system 200. Memory 250 may represent an in-memory database for real-time (e.g., Apache, Ignite, Oracle, etc.) and persistent Big Data storage using HDFS, such as Hadoop, for example. Memory 250 may represent a database cluster, a Cloud storage interface or other type of storage device. For example, Memory 250 may store account data for customers as well as customer profile data. Memory 250 may also contain additional information related to the operation and administration of the system 200. Memory 250 may include any suitable data structure to maintain the information and allow access and retrieval of the information. For example, Memory 250 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Memory 250 may be any suitable storage device or devices. The storage may be local, remote, or a combination thereof with respect to Memory 250. Memory 250 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Memory 250 may have back-up capability built-in.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 3:
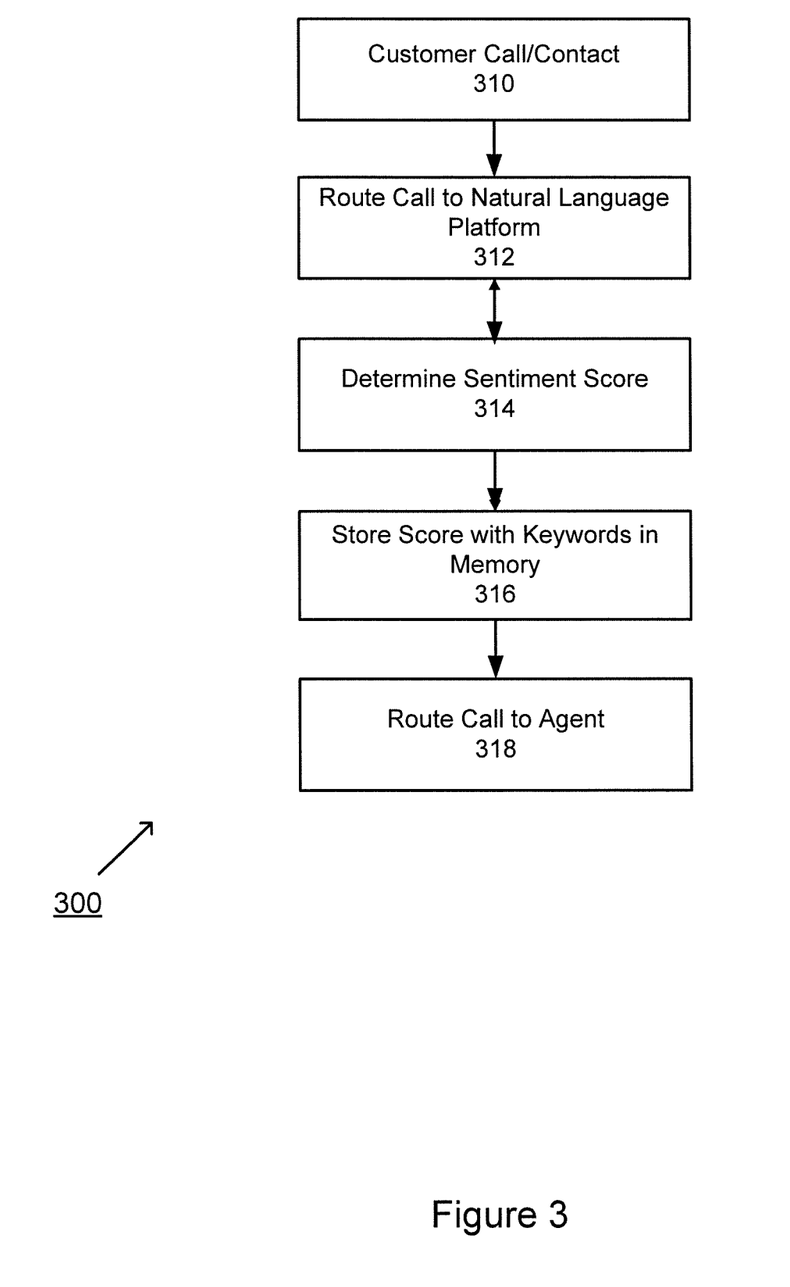
FIG. 3 is an exemplary flowchart for analyzing customer voice interactions, according to an embodiment of the present invention.

FIG. 3 is an exemplary flowchart for analyzing customer voice interactions, according to an embodiment of the present invention. At step 310, a customer may initiate or respond to an interaction with an entity. At step 312, the customer contact may be routed to a Natural Language Platform. At step 314, a Real time Speech Engine may process the voice data and generate a score that represents customer sentiment. At step 316, the score and associated keywords may be stored in memory. At step 318, the call with the score may be routed to an appropriate agent. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a customer may initiate or respond to a customer interaction. For example, a customer may call using the PSTN (TDM/VoIP), Internet Voice (WebRTC), etc. Other modes of communication may be implemented.

At step 312, the customer contact may be routed to a Natural Language Platform. For example, a Session Layer may route a call to Voice Response Natural Language Platform for the customer to engage in a self-service session. The customer may interact using voice, keys and/or other input.

At step 314, Real time Speech Engine may process the voice data and generate a score that represents customer sentiment. Voice Response unit, while processing a customer request for self-service, may pass media and/or audio data to a real-time speech analytics engine that detects emotion and/or sentiment of the customer in the form of a score. Also, the unit may records keywords spoken in the form of text as well as other data.

At step 316, the score and associated keywords may be stored. For example, the emotion and sentiment score with additional keywords may be stored in memory, such as a data store. The memory may be shared across multiple assisted and/or unassisted channels as well as other customer touch points that may interact with a customer.

At step 318, the call with the score may be routed to an appropriate agent. For example, the customer may request contact with an agent or other specialist for advanced assistance. When the customer interacts with the agent or specialist, the system, via a Media Processor, may fork (e.g., create a copy of) the audio and pass that to a speech analytics engine. The engine may continue to detect keywords, emotion and/or sentiment of the conversation.

Using the customer's sentiment data, the system may intelligently route a customer to an appropriate agent. For a high value customer, the system may seek to route this customer to a supervisor or manager rather than a new agent in training. Also, the system may avoid sending an agitated customer to a new agent, but rather an experienced agent who can calm the customer down and properly address the customer's concern.

An embodiment of the present invention may also rate an agent (or other customer service specialist, representative). The agent rating may include various factors regarding experience, expertise, tenure, preferences, etc. The agent rating may be considered when the system routes customers. The system may track and consider metrics including: years of experience; patience (e.g., how capable of handling anger); escalation percentage (e.g., how often they escalate); concession percentage (e.g., how often they offer concessions); disarming/empathy factor (e.g., amount of time to reduce to anger which may be indicated by a customer's tone of voice); expertise of subject matter, time period since last angry customer, etc.

Also, a Contact Center Interaction Router/Manager may use the data collected and stored in the memory, e.g., data store. For example, the attributes about what and why the customer initiated the conversation including emotion and sentiment scores may be used to identify an appropriate agent/specialist to handle the customer interaction. In this example, a customer interaction based on the attributes and emotion/sentiment score may trigger a need for a supervisor to either listen-in to help the agent or specialist or the supervisor may be needed to intervene and take over the interaction to meet the customer demands or resolve a complex complaint/reason for call.

Figure 4:
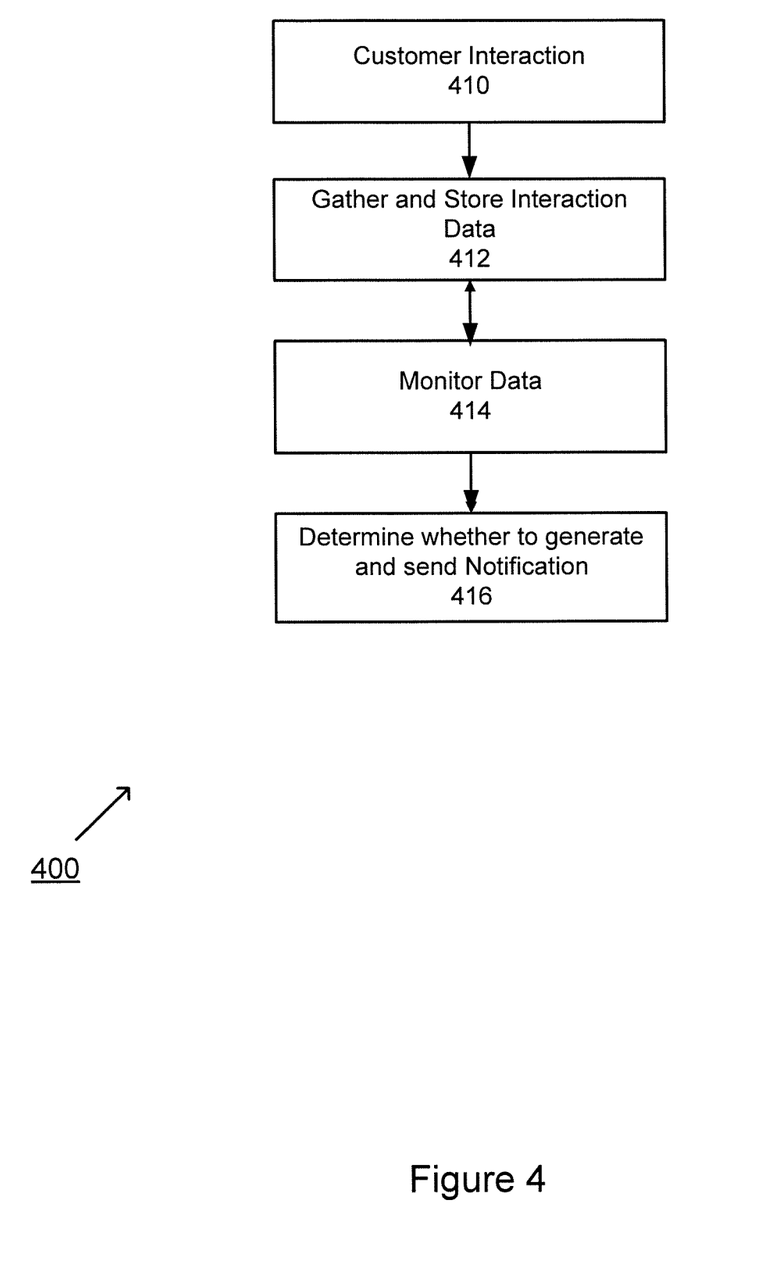
FIG. 4 is an exemplary flowchart of analyzing customer interactions, according to an embodiment of the present invention.

FIG. 4 is an exemplary flowchart of analyzing customer interactions, according to an embodiment of the present invention. At step 410, a customer interaction may be initiated. At step 412, the data may be received, processed and stored in a memory. At step 414, Proactive Notification Engine may monitor the customer interaction. At step 416, the engine may determine whether to generate and send a notification. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a customer interaction may be initiated. For example, touch points and/or IoT (Internet of Things) devices may generate event and store a filtered, selected and/or concise customer interactions into the memory. Touch point events may include ATM transactions, credit card interactions, card decline, web access failure, mobile access failure, other backend failures, offline approval, social media, customer payments, etc. Other related and/or relevant events may be captured.

At step 412, the data may be received and processed. The information may be stored and used by an entity to address and resolve issues before the customer even contacts the entity. Also, the data may be used in other customer interaction channels to provide additional context and sentiment information.

At step 414, a notification engine may monitor the customer interaction. For example, Proactive Notification Engine may monitor the data store of the various events. The system may determine that the customer recently lost a card. In this situation, the system may initiate the process to issue a customer a new card and the notification engine may inform the customer. In some instances, the system may remedy the situation even before the customer contacts the entity to complain.

At step 416, the engine may determine whether to generate and send a notification. Proactive Notification Engine may determine if a notification needs to be sent and/or updated to the supervisor, customer and/or agent or specialist to improve the customer experience. An example of notification to the customer may occur via voice channel and a supervisor via an application or SMS.

Figure 5:
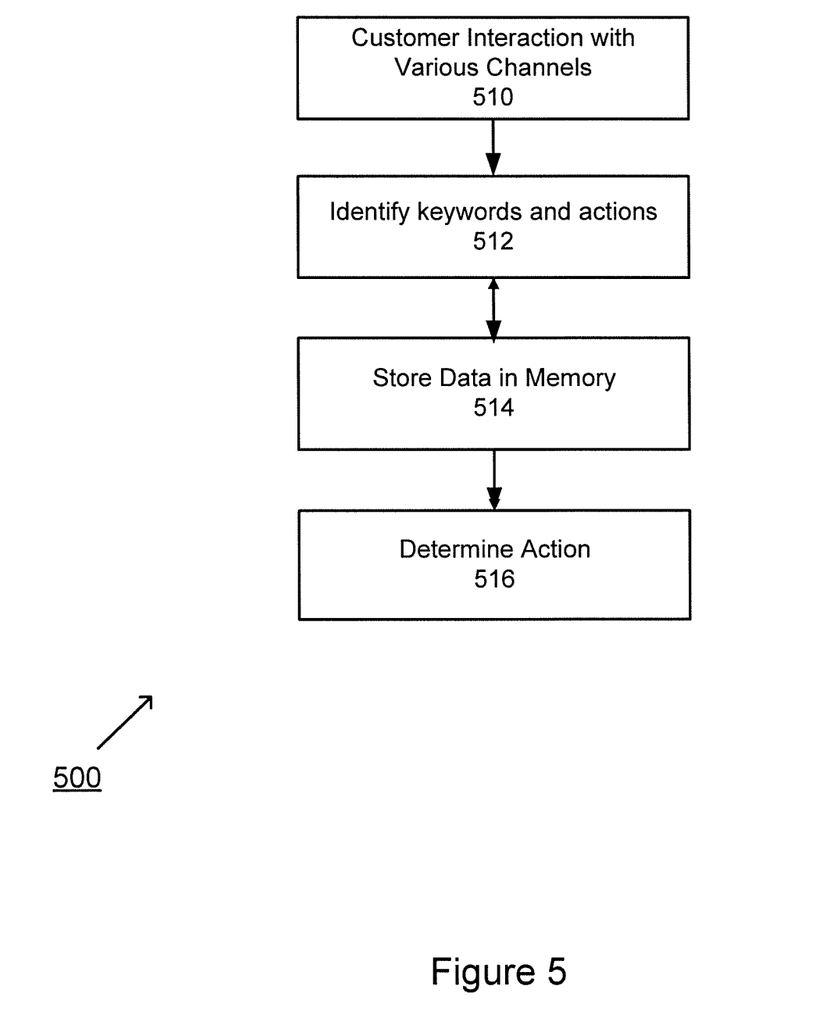
FIG. 5 is an exemplary flowchart of a method for analyzing text based customer interactions, according to an embodiment of the present invention.

FIG. 5 is an exemplary flowchart of a method for analyzing text based customer interactions, according to an embodiment of the present invention. At step 510, a customer interaction via various channels may be initiated. At step 512, keywords and actions may be identified. At step 514, the keywords and actions may be stored in memory. At step 516, one or more responsive actions may be determined. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 510, a customer interaction via various channels may be initiated. A customer may interact with one or more alternate channels For example, a customer may interact via a website when the customer is logged in to their online account. Customer interaction may be captured by various other electronic contacts using a desktop, personal computer, tablet, smartphone and/or other electronic device. Other inactions may include mobile chat (via a mobile app), email and/or SMS. Other interactions may include contact with a system that provides automated responses or other self-serve ability.

At step 512, keywords and actions may be identified. The interactions may be forked and/or shared with a Real Time Text Analytics Engine that looks for keywords and other indicia of customer sentiment. The system may also capture a customer's online activity, including search terms, websites, articles, etc. Customers may search for answers using a search engine or by visiting an entity's website before contacting the entity. For example, during the customer's last transaction, the customer's credit card may have been declined. Prior to engaging the entity, the customer may search for "credit card decline" in a search engine. Also, the customer may engage a voice assistant application to perform a search. In this example, the customer's voice and search terms may be analyzed for sentiment.

At step 514, the keywords and actions may be stored in memory. Real-time speech analytics may store the keywords and sentiment in the memory for consumption by other components.

At step 516, one or more responsive actions may be determined. The customer interaction, which may be based on attributes and emotion/sentiment score, may trigger a need for a supervisor to either listen-in to help the agent or specialist or intervene and take over the interaction to meet the customer demands or resolve a complex complaint/reason for interaction. Real-time text analytics engine may continue to detect keywords and sentiment when the interaction moves from an unassisted to assisted channel so the supervisor may be notified (automatic escalation) and may intervene similar to a voice call.

Although the foregoing description has focused primarily on a financial institution detecting customer sentiment, the system may be operated and maintained by other types of commercial entities who may configure the system to provide similar advantages to their customers.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

FIG. 2 may include a number of servers and user communication devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers, modules, components illustrated in FIG. 2 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A customer interaction management system comprising:
    a memory that stores customer profile data and customer interaction data;
    a voice response input that receives a voice pattern from a customer; and
    a computer processor, coupled to the memory and the voice response input, programmed to:
    retrieve customer voice data from a current customer interaction via a voice channel, the current customer interaction comprises an interactive voice response (IVR) process;

retrieve data from one or more other interactions via one or more other channels relating to account activity on the customer account and transaction activity with one or more merchants;

compare the customer voice data to a customer baseline, where the customer baseline is developed from one or more prior customer voice interactions;

calculate, using a speech analytics engine, a customer score that indicates customer sentiment based on the customer voice data and the data from one or more other interactions;

during the current customer interaction, update the customer score based on customer progress data; and develop one or more actions, in response to the customer score.

2. The system of claim 1, wherein the one or more other interactions comprise online channels including web, chat, email and SMS.

3. The system of claim 1, wherein the one or more other interactions comprise one or more touch points.

4. The system of claim 1, wherein the customer score is based on the customer voice data being a predetermined threshold above the customer baseline.

5. The system of claim 1, wherein data from the one or more other interactions is analyzed by a real-time text analytics processor to update the customer score.

6. The system of claim 1, wherein data from the one or more other interactions comprises online search terms and results.

7. The system of claim 1, wherein the one or more actions comprises involving a supervisor to participate in the customer interaction.

8. The system of claim 1, wherein the one or more actions comprises shortening a IVR session.

9. The system of claim 1, wherein the one or more actions comprises performing predictive analytics based on the customer interaction data.

10. The system of claim 1, wherein the customer is routed to an appropriate agent based on the customer score.

11. A customer interaction management method, the method comprising the steps of:

retrieving, using a voice response input, customer voice data from a current customer interaction via a voice channel, the current customer interaction comprises an interactive voice response (IVR) process;

retrieving data from one or more other interactions via one or more other channels relating to account activity on the customer account and transaction activity with one or more merchants;

comparing, using a computer processor, the customer voice data to a customer baseline, where the customer baseline is developed from one or more prior customer voice interactions;

calculating, using a speech analytics engine, a customer score that indicates customer sentiment based on the customer voice data and the data from one or more other interactions;

during the current customer interaction, updating the customer score based on customer progress data; and providing one or more actions, in response to the customer score.

12. The method of claim 11, wherein the one or more other interactions comprise online channels including web, chat, email and SMS.

13. The method of claim 11, wherein the one or more other interactions comprise one or more touch points.

14. The method of claim 11, wherein the customer score is based on the customer voice data being a predetermined threshold above the customer baseline.

15. The method of claim 11, wherein data from the one or more other interactions is analyzed by a real-time text analytics processor to update the customer score.

16. The method of claim 11, wherein data from the one or more other interactions comprises online search terms and results.

17. The method of claim 11, wherein the one or more actions comprises involving a supervisor to participate in the customer interaction.

18. The method of claim 11, wherein the one or more actions comprises shortening a IVR session.

19. The method of claim 11, wherein the one or more actions comprises performing predictive analytics based on the customer interaction data.

20. The method of claim 11, wherein the customer is routed to an appropriate agent based on the customer score.

* * * * *